United States Patent
Kim

(10) Patent No.: US 10,244,891 B2
(45) Date of Patent: Apr. 2, 2019

(54) KITCHEN APPLIANCE COATED BY DOT METHOD AND METHOD OF PREPARING THE SAME

(71) Applicant: Ryong Kim, Seoul (KR)

(72) Inventor: Ryong Kim, Seoul (KR)

( * ) Notice: Subject to any disclaimer, the term of this patent is extended or adjusted under 35 U.S.C. 154(b) by 0 days.

(21) Appl. No.: 14/726,835

(22) Filed: Jun. 1, 2015

(65) Prior Publication Data

US 2015/0359383 A1    Dec. 17, 2015

(30) Foreign Application Priority Data

Jun. 16, 2014  (KR) .................. 10-2014-0072910

(51) Int. Cl.
*B05D 1/02*  (2006.01)
*B05D 5/02*  (2006.01)
(Continued)

(52) U.S. Cl.
CPC ............. *A47J 36/02* (2013.01); *A47J 36/025* (2013.01); *B05D 5/02* (2013.01); *B05D 5/06* (2013.01);
(Continued)

(58) Field of Classification Search
CPC .............. A47J 36/00; B05D 5/00; B05D 7/00
See application file for complete search history.

(56) References Cited

U.S. PATENT DOCUMENTS 4,180,609 A * 12/1979 Vassiliou ............... A47J 36/02
                                                              427/375
5,667,891 A *  9/1997 Batzar .................... A47J 36/02
                                                              427/203

(Continued)

FOREIGN PATENT DOCUMENTS

JP    2010064487 A  *  3/2010
KR   1020100031440      3/2010
KR   1020130057641      6/2013

OTHER PUBLICATIONS

Translation of JP 2010-064487 (Year: 2010).*

*Primary Examiner* — Maria V Ewald
*Assistant Examiner* — Daniel P Dillon
(74) *Attorney, Agent, or Firm* — Weiss & Moy, P.C.; Jeffrey D. Moy

(57) ABSTRACT

Provided are a kitchen appliance coated by a dot method including a primer coating layer formed on a surface of the kitchen appliance, and a dot layer formed in a dot shape on a surface of the primer coating layer by repetitive point spraying a coating solution of dot particles, wherein the dot particles are individually adhered to the primer coating layer by the point spraying to form a surface, the dot particles has an average diameter of 5 μm to 10 mm when being adhered to the primer coating layer by the point spraying, an area ratio of the dot layer to the primer coating layer is in a range of 60% to 98%, the dot layer is spattered by a point spraying method in which the dot layer is formed by overlapping 0 to 20 layers of the dot particles, various colors of the dot layer are obtained by simultaneously or individually point spraying through a plurality of nozzles respectively including coating solutions of various colors, and a liquid component of the dot particles point sprayed in a form of a liquid is dried during drying to be separated into the individual dot particle to cause irregularities at an upper end portion of the dot layer in view of the entire dot layer, and a method of preparing the kitchen appliance.

5 Claims, 2 Drawing Sheets

(51) Int. Cl.
*B05D 5/06* (2006.01)
*B05D 5/08* (2006.01)
*B05D 7/00* (2006.01)
*A47J 36/02* (2006.01)

(52) U.S. Cl.
CPC ............ *B05D 5/08* (2013.01); *B05D 7/56* (2013.01); *B05D 1/02* (2013.01); *B05D 2202/00* (2013.01); *B05D 2401/32* (2013.01); *Y10T 428/24372* (2015.01)

(56) References Cited

U.S. PATENT DOCUMENTS

2008/0187667 A1* 8/2008 Hennessey .............. B05D 1/06
　　　　　　　　　　　　　　　　　　　　　　　　　427/299
2009/0202782 A1* 8/2009 Cardoso ................ A47J 36/025
　　　　　　　　　　　　　　　　　　　　　　　　　428/149

* cited by examiner

[Fig1.]
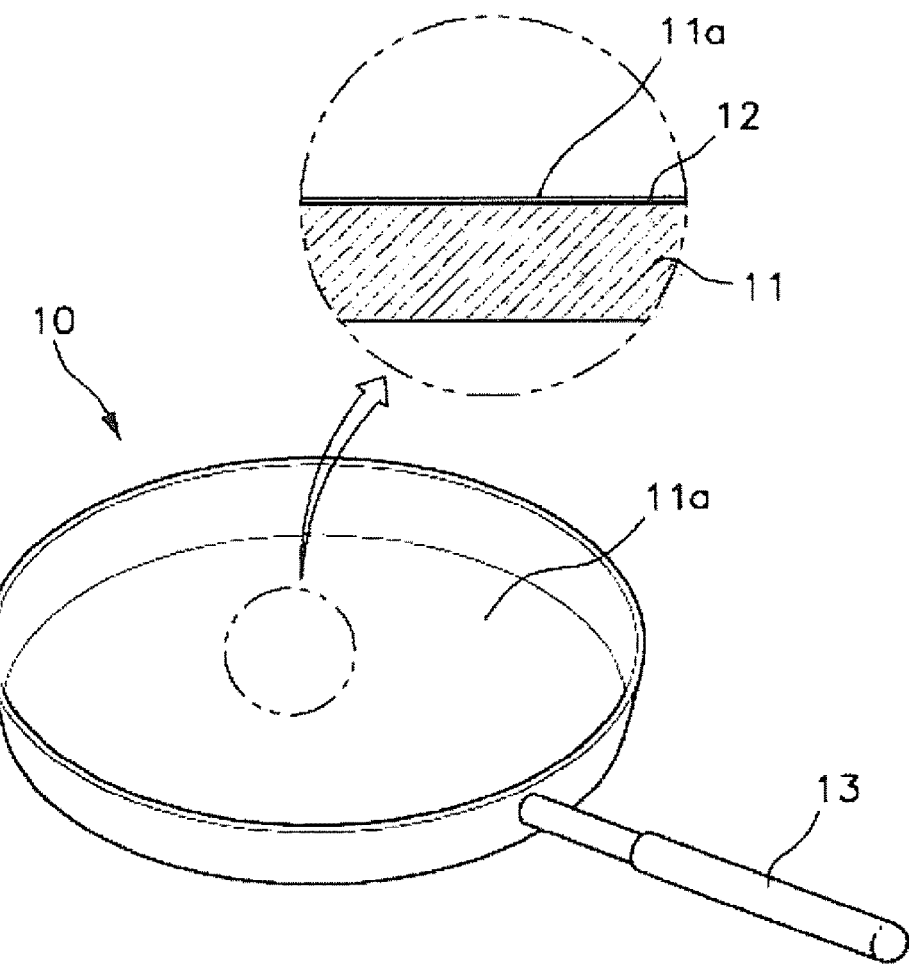
[Fig 2]
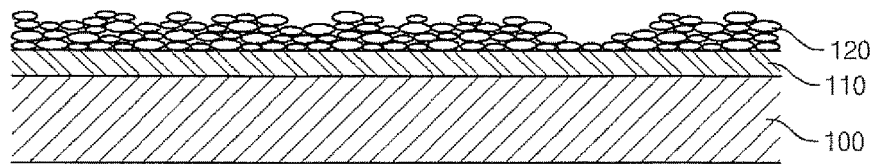

[Fig 3]
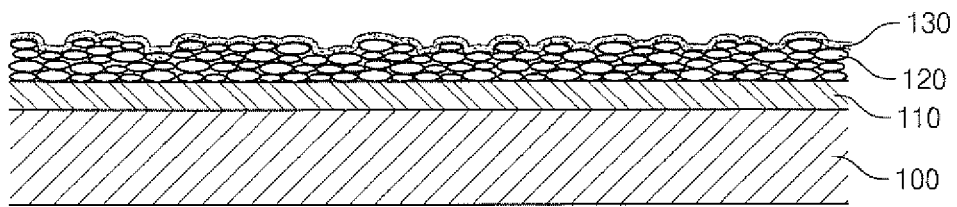

KITCHEN APPLIANCE COATED BY DOT METHOD AND METHOD OF PREPARING THE SAME

BACKGROUND OF THE INVENTION

Field of the Invention

The present invention relates to a kitchen appliance coated by a dot method and a method of preparing the same, and more particularly, to a kitchen appliance having an entire surface thereof coated by a dot method and a method of preparing the same.

Description of the Related Art

In general, a kitchen appliance denotes a container that stores and cooks food, such as a frying pan and a pot.

FIG. 1 illustrates a typical kitchen appliance.

Referring to FIG. 1, a typical kitchen appliance will be described below.

As illustrated in FIG. 1, the kitchen appliance 10 is composed of a main body, in which food cooking takes place, and a handle 13. In the main body, at least one protective coating layer 12 is formed on a cooking surface lie so as to easily remove burnt stains during cleaning while preventing the sticking of food.

In general, a kitchen appliance denotes a container that stores and cooks food, such as a frying pan and a pot, the configuration thereof includes a main body having a shape of a bowl and a handle formed on one side or both sides thereof or a detachable handle so as to facilitate the handling of the main body, and the kitchen appliance is coated with the protective coating layer 12 protecting a surface 11 thereof.

Various attempts have been made to design the surfaces of kitchen appliances, i.e., to form an image coating layer and new visual effects as the requirements of buyers on the design of kitchen appliances have been diversified, and as an example of such attempts, various patterns are formed on the surfaces of kitchen appliances in such a manner that a unique pattern is formed on the surface of a pot using silk printing.

However, the following limitations may occur when a kitchen appliance is prepared by the above-described typical method.

First, since the color of a cooking surface of a typical kitchen appliance is generally dark and monochrome, there may be limitations in improving commercial properties of the product or the desire of women, as users as well as buyers, to buy the product.

Second, since a side of a typical kitchen appliance is a vertically curved surface, changes in a simple color may be made by forming a pattern on the bottom surface of the kitchen appliance using a method such as screen printing, transferring, or pad stamping. For this, a separate apparatus or additional work may be required.

Finally, with respect to a typical method of preparing a kitchen appliance, since a pigment is typically sprayed at a high pressure, a large amount of scattering loss may not only occur but the thickness of a coating layer may also not be selectively controlled.

Also, the aesthetic improvement of a kitchen appliance may be limited because color effects are obtained only on a portion of a surface of the kitchen appliance instead of the entire surface thereof.

SUMMARY OF THE INVENTION

An object of the present invention is to provide a kitchen appliance having a surface thereof selectively coated and having durability while forming a coating layer having a desired thickness which is thicker than a typical one.

Another object of the present invention is to provide a method of preparing a kitchen appliance which may minimize the loss of a coating solution in coating the surface of the kitchen appliance.

A further object of the present invention is to provide a kitchen appliance in various colors by preparing coating solutions for each color in coating the surface of the kitchen appliance with a coating layer.

According to an aspect of the present invention, there is provided a kitchen appliance coated by a dot method including: a primer coating layer formed on a surface of the kitchen appliance; and a dot layer formed in a dot shape on a surface of the primer coating layer by repetitive point spraying a coating solution of dot particles, wherein the dot particles are individually adhered to the primer coating layer by the point spraying to form a surface, the dot particles has an average diameter of 5 μm to 10 mm when being adhered to the primer coating layer by the point spraying, an area ratio of the dot layer to the primer coating layer is in a range of 60% to 98%, the dot layer is spattered by a point spraying method in which the dot layer is formed by overlapping 0 to 20 layers of the dot particles, various colors of the dot layer are obtained by simultaneously or individually point spraying through a plurality of nozzles respectively including coating solutions of various colors, and a liquid component of the dot particles point sprayed in a form of a liquid is dried during drying to be separated into the individual dot particle to cause irregularities at an upper end portion of the dot layer in view of the entire dot layer.

According to another aspect of the present invention, there is provided a kitchen appliance coated by a dot method wherein a thickness of the dot layer is in a range of 20 μm to 150 μm.

According to a further aspect of the present invention, there is provided a kitchen appliance coated by a dot method wherein a top coating layer is further formed on the dot layer.

According to a further aspect of the present invention, there is provided a kitchen appliance coated by a dot method wherein the dot layer is formed by point spraying at a pressure of 0.2 MP to 1.0 MP.

According to a further aspect of the present invention, there is provided a method of preparing a kitchen appliance coated by a dot method including: forming a primer coating layer by coating a surface of the kitchen appliance with a primer coating solution to a thickness of 10 μm to 12 μm and drying at a temperature of 100° C. to 200° C.; forming a dot layer in which an entire surface of the primer coating layer is repetitively point sprayed with a coating solution to form a dot shape; and performing a heat treatment at a temperature of 400° C. to 420° C., wherein the dot particles are individually adhered to the primer coating layer by the point spraying to form a surface, the dot particles has an average diameter of 5 μm to 10 mm when being adhered to the primer coating layer by the point spraying, an area ratio of the dot layer to the primer coating layer is in a range of 60% to 98%, the dot layer is spattered by a point spraying method in which the dot layer is formed by overlapping 0 to 20 layers of the dot particles, various colors of the dot layer are obtained by simultaneously or individually point spraying through a plurality of nozzles respectively including coating solutions of various colors, and a liquid component of the dot particles point sprayed in a form of a liquid is dried during drying to be separated into the individual dot particle to cause irregularities at an upper end portion of the dot layer in view of the entire dot layer.

According to a further aspect of the present invention, there is provided a method of preparing a kitchen appliance coated by a dot method further including forming a top coating layer by drying at a temperature of 100° C. to 200° C. after the forming of the dot layer, coating a top coating solution to a thickness of 8 µm to 12 µm, and heat treating at a temperature of 400° C. to 420° C.

According to a further aspect of the present invention, there is provided a method of preparing a kitchen appliance coated by a dot method wherein a thickness of the dot layer is in a range of 20 µm to 150 µm.

According to a further aspect of the present invention, there is provided a method of preparing a kitchen appliance coated by a dot method wherein the dot layer is formed by point spraying at a pressure of 0.2 MP to 1.0 MP.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a typical kitchen appliance;

FIG. 2 is a cross-sectional view illustrating an embodiment of a kitchen appliance coated by a dot method of the present invention; and FIG. 3 is a cross-sectional view illustrating another embodiment of a kitchen appliance coated by a dot method of the present invention.

DETAILED DESCRIPTION OF THE INVENTION

Hereinafter, preferred embodiments of the present invention will be described in detail with reference to the accompanying drawings.

Wherever possible, the same reference numbers will be used throughout the drawings to refer to the same or like parts. In the following description, well-known functions or constructions are not described in detail to avoid obscuring the disclosure in unnecessary detail.

The terms regarding degrees used in this specification, for example, "about", "substantially", etc. should be construed as including the proposed fabrication and material deviation, and are used to prevent unconscientious infringers from illegally using content disclosed as accurate or absolute values for helping understanding of the present invention.

FIG. 2 is a cross-sectional view illustrating an embodiment of a kitchen appliance coated by a dot method of the present invention, and FIG. 3 is a cross-sectional view illustrating another embodiment of a kitchen appliance coated by a dot method of the present invention.

As illustrated in FIGS. 2 and 3, in a kitchen appliance coated by a dot method of the present invention and a method of preparing the same, a primer coating layer 110 and a dot layer 120 are formed on a surface of the kitchen appliance, or the primer coating layer 110, the dot layer 120, and a top coating layer 130 may be selectively used and coated.

First, in the present invention, the primer coating layer 110 is formed on a surface 100 of the kitchen appliance, wherein the primer coating layer 110 is formed so as to allow the surface of the kitchen appliance to be well coated with a coating solution.

A composition of the primer coating layer 110 is not particularly limited, and a mixture having polyamideimide dissolved in N-methyl-2-pyrrolidone (NMP), a polytetrafluoroethylene (PTFE) dispersion, a carbon black dispersion, and a silica dispersion may be used. For example, the composition may include 63 wt % to 74 wt % of the mixture having polyamideimide dissolved in NMP, 3 wt % to 5 wt % of water, 15 wt % to 18 wt % of the PTFE dispersion, 2 wt % to 4 wt % of the carbon black dispersion, and 6 wt % to 10 wt % of the silica dispersion.

The surface of the kitchen appliance may be coated with a primer coating solution to a thickness of 10 µm to 12 µm to form the primer coating layer 110 and the primer coating layer 110 may be dried in a temperature range of 100° C. to 200° C. for about 5 minutes to 20 minutes.

The temperature for the drying of the primer coating layer 110 may be determined in consideration of workability and working time. In the case that the drying time of the primer coating layer 110 is less than 5 minutes, an operation of uniformly coating the kitchen appliance during the coating may be difficult due to insufficient drying time. In the case in which the drying time of the primer coating layer 110 is greater than 20 minutes, working time may be increased.

Also, the dot layer 120 may be formed on the primer coating layer 110, wherein a coating solution is spattered on an entire surface of the kitchen appliance having the primer coating layer 110 formed thereon by repetitive point spraying to form the dot layer 120.

When the coating solution of the dot layer 120 is spattered by point spraying, the coating solution is one by one separated in the form of a dot particle to each individually form a surface. That is, the dot particles of the coating solution are individually adhered to the primer coating layer 110 by the point spraying so that the surface may be formed.

An average diameter of the point-sprayed dot particles may vary in a range of 5 µm to 10 mm.

The diameter of the dot particles may be freely adjusted and this may be possible by controlling a nozzle for point spraying.

0 to 20 layers of the dot particles may overlap when the dot particles of the dot layer 120 are point sprayed on the primer coating layer 110. Since many layers of the dot particles overlap one another by repetitive point spraying, the dot layer 120 may be formed. In the case that the dot layer 120 is formed by the point spraying, cracks may not occur in the dot layer 120 even if the dot layer 120 is formed to be thicker than other coating structures.

The reason why cracks do not occur is that since a liquid component of the dot particles point sprayed in the form of a liquid is dried during the drying, the dot particles individually shrink to cause irregularities at an upper end portion of the dot layer in view of the entire dot layer. This is different from the case that cracks generally occur during dying when a coating layer is formed to a thickness of 50 µm or more, and simultaneously, this may be the effect of the present invention in which cracks do not occur even in the case in which a thick coating layer having a thickness of 50 µm or more is formed.

Also, the dot layer 120 may be formed from coating solutions of various colors, wherein the coating solutions for each color are prepared during the formation of the dot layer 120 and the dot layer 120 may be formed by simultaneously or individually spraying using a plurality of nozzles.

A composition of the dot layer 120 may include a PTFE dispersion, water, aromatic hydrocarbon, triethylamine, oleic acid, a surfactant, and an inorganic pigment. As a specific example, the composition may include 86 wt % to 92 wt % of the PTFE dispersion, 5.5 wt % to 6.53 wt % of the water, 0.5 wt % to 1.5 wt % of the aromatic hydrocarbon, 0.2 wt % to 0.5 wt % of the triethylamine, 0.2 wt % to 0.5 wt % of the oleic acid, 0.1 wt % to 0.4 wt % of the surfactant, and 1.5 wt % to 3.5 wt % of the inorganic pigment.

Also, the formation of the dot layer 120 may be performed by low-pressure point spraying, wherein the point spraying is performed at a pressure of 0.2 MP to 1.0 MP to minimize the loss due to scattering droplets of the coating solution, and thus, the dot layer 120 may be coated to a thickness of 20 μm to 150 μm.

That is, in the case that spraying is performed by a typical spraying method, since the spraying is performed in the form of a gas, a 30% to 60% loss of the sprayed coating solution may occur. However, in the case in which the low-pressure point spraying is performed in such a manner that the diameter of particles is increased and the particles are dropped by the point spraying during the formation of the dot layer of the present invention, a loss is hardly generated.

Also, in the present invention, the kitchen appliance may be heat treated at a temperature of 400° C. to 420° C. for 5 minutes to 20 minutes after the dot layer 120 is formed.

Furthermore, in the heat treatment, the kitchen appliance may be dried at a temperature of 400° C. to 420° C. for about 5 minutes to about 20 minutes. The reason for this is that the kitchen appliance is dried at a high heat treatment temperature to increase coating efficiency. In the case that the heat treatment is performed at a temperature lower than 400° C., since melt-sintering of a PTFE resin is not sufficient, a solid coating is difficult to be formed.

In the present invention, a top coating layer 130 may be further formed on the dot layer 120 before the heat treatment after the formation of the dot layer 120.

The dot layer 120 is coated with a top coating solution to a thickness of 8 μm to 12 μm, and the top coating layer 130 is then formed by performing a heat treatment at a temperature of 400° C. to 420° C. for about 5 minutes to about 20 minutes.

Herein, the drying temperature may be determined in consideration of workability and working time. In the case that the drying time is less than 5 minutes, an operation of uniformly coating the kitchen appliance during the coating may be difficult due to insufficient drying time. Also, in the case in which the drying time is greater than 20 minutes, working time may be increased.

A composition of the top coating layer 130 is not particularly limited, and a PTFE dispersion, aromatic hydrocarbon, triethylamine, oleic acid, a surfactant, mica, and water may be used. For example, the composition may include 86 wt % to 92 wt % of the PTFE dispersion, 5.5 wt % to 6.53 wt % of the water, 0.5 wt % to 1.5 wt % of the aromatic hydrocarbon, 0.2 wt % to 0.5 wt % of the triethylamine, 0.2 wt % to 0.5 wt % of the oleic acid, 0.1 wt % to 0.4 wt % of the surfactant, and 1.5 wt % to 3.5 wt % of the mica.

A kitchen appliance coated by a dot method according to the present invention and a method of preparing the same may have an effect in that durability may be obtained in which cracks do not occur even if a coating layer having a large thickness of 50 μm to 150 μm is formed and a failure rate in the preparation of the kitchen appliance may be reduced.

The kitchen appliance coated by a dot method according to the present invention and the method of preparing the same may have an effect in that the surface of the kitchen appliance is selectively coated with a primer coating layer, a dot layer, and a top coating layer but the coating is performed by low-pressure point spraying during the formation of the dot layer, and thus, the loss due to scattering droplets of the coating solution may be minimized through the low-pressure spraying.

Also, the kitchen appliance coated by a dot method of the present invention and the method of preparing the same may have an effect in that coating solutions having different colors are prepared in a plurality of nozzles and point sprayed to produce a dot layer coated on the surface of the kitchen appliance which may show a single color or multiple colors, and thus, the aesthetics of the kitchen appliance may be improved.

While the present invention has been particularly shown and described with reference to exemplary embodiments thereof, it will be understood by those of ordinary skill in the art that various modifications and substitutions may be made thereto without departing from the spirit and scope of the present invention as defined by the following claims.

What is claimed is:

1. A kitchen appliance coated by a dot method, the kitchen appliance comprising:
   a primer coating layer formed on a surface of the kitchen appliance, wherein a thickness of the primer coating is in a range of 10 um to 12 um, wherein the primer coating layer comprises 63 wt % to 74 wt % of polyamideimide dissolved in N-methyl-2-pyrrolidone (NMP), 3 wt % to 5 wt % of water, 15 wt % to 18 wt % of a polytetrafluoroethylene (PTFE) dispersion, 2 wt % to 4 wt % of a carbon black dispersion, and 6 wt % to 10 wt % of a silica dispersion;
   a dot layer formed in a dot shape on a surface of the primer coating layer by repetitive point spraying a coating solution of dot particles, wherein a thickness of the dot layer is in a range of 130 um to 150 um; and
   a top coating layer is further formed on the dot layer, the top coat having a thickness in a range of 8 um to 12 um;
   wherein the dot particles are individually adhered to the primer coating layer by the point spraying to form a surface and has an average diameter of 5 um to 10 mm when being adhered to the primer coating layer by the point spraying;
   wherein an area ratio of the dot layer to the primer coating layer is in a range of 60% to 98%;
   wherein the dot layer is spattered by a point spraying method in which the dot layer is formed by overlapping 0 to 20 layers of the dot particles and various colors of the dot layer are obtained by simultaneously or individually point spraying through a plurality of nozzles respectively including coating solutions of various colors; and
   wherein a liquid component of the dot particles point sprayed in a form of a liquid is dried during drying to be separated into the individual dot particle to cause irregularities at an upper end portion of the dot layer in view of the entire dot layer.

2. The kitchen appliance coated by a dot method of claim 1, wherein the dot layer is formed by point spraying at a pressure of 0.2 MP to 1.0 MP.

3. The kitchen appliance coated by a dot method of claim 1, wherein the various colors of the dot layer are obtained by simultaneously point spraying through a plurality of nozzles a plurality of coating solutions of various colors to obtained a desired color.

4. The kitchen appliance coated by a dot method of claim 1, wherein the dot layer comprises 86 wt % to 92 wt % of a polytetrafluoroethylene (PTFE) dispersion, 5.5 wt % to 6.53 wt % of a water, 0.5 wt % to 1.5 wt % of an aromatic hydrocarbon, 0.2 wt % to 0.5 wt % of a triethylamine, 0.2 wt % to 0.5 wt % of an oleic acid, 0.1 wt % to 0.4 wt % of a surfactant, and 1.5 wt % to 3.5 wt % of an inorganic pigment.

5. The kitchen appliance coated by a dot method of claim 1, wherein the top coat comprises 86 wt % to 92 wt % of a polytetrafluoroethylene (PTFE) dispersion, 5.5 wt % to 6.53 wt % of a water, 0.5 wt % to 1.5 wt % of an aromatic hydrocarbon, 0.2 wt % to 0.5 wt % of a triethylamine, 0.2 wt % to 0.5 wt % of an oleic acid, 0.1 wt % to 0.4 wt % of a surfactant, and 1.5 wt % to 3.5 wt % of a mica.

* * * * *